May 21, 1963

S. E. SHIELDS ETAL 3,090,233

TEMPERATURE MEASUREMENT MECHANISM

Filed Dec. 22, 1959

INVENTORS:
Stanley E. Shields
Philip W. Dewey

BY Douglas G. Brown

ATTORNEY

May 21, 1963

S. E. SHIELDS ETAL 3,090,233

TEMPERATURE MEASUREMENT MECHANISM

Filed Dec. 22, 1959

INVENTORS:
Stanley E. Shields
BY  Philip W. Dewey

Douglas G. Brace

ATTORNEY

United States Patent Office 3,090,233
Patented May 21, 1963

3,090,233
TEMPERATURE MEASUREMENT MECHANISM
Stanley E. Shields, Whiting, and Philip W. Dewey, Munster, Ind., assignors to Standard Oil Company, Chicago, Ill., a corporation of Indiana
Filed Dec. 22, 1959, Ser. No. 861,387
7 Claims. (Cl. 73—343)

This invention relates to a mechanism for measuring temperature along a predetermined path in a reaction zone.

Temperature is frequently an important process variable used in controlling chemical and petroleum processes which are conducted in a reaction vessel, often referred to as a reaction zone. In some instances, the temperature throughout a reaction zone will vary, rather than being uniform; and in some instances, such as the regeneration of a fixed bed catalytic reforming reaction zone, the temperature gradient will be dynamic instead of static. It is frequently desirable to obtain temperature profiles of the reaction zone during the course of the reaction in order to ascertain the shifting of a dynamic temperature gradient.

Heretofore it has been possible to obtain temperature profiles based only on temperature measurements at discrete, predetermined distances from the periphery of the reaction zone. This has been done in a number of ways: using a bundle of thermocouples inserted in a common thermowell having their respective bimetallic junctions spced at known intervals throughout the thermowell; or using a single thermocouple moved by hand throughout a thermowell extending into the reaction zone; or using several thermocouples, each inserted into a separate thermowell a known distance from the edge of the reaction zone.

All of the foregoing methods have serious shortcomings. In the instance of a small reaction zone as is used in pilot plants, the volume occupied by one large or a number of small diameter thermowells is disproportionately large compared to the over-all volume of the reaction zone, thereby creating scale-up problems and tending to distort the temperature profile on account of heat transfer along the walls of the thermowell or thermowells. Furthermore, when using multiple thermocouples, their respective calibrations may change disproportionately one to another, thereby giving inaccurate incremental temperature measurements. A multiplicity of thermocouples is, of course, more expensive than using only a single thermocouple. Although using a single thermocouple avoids most of the foregoing shortcomings, movement of a single thermocouple is laborious and subject to human error in correctly positioning the thermocouple at the same relative position in the reaction zone on successive temperature measurements at such point.

It is, therefore, an object of this invention to provide a mechanism for obtaining a temperature profile along a predetermined path in a reaction zone using only a single temperature sensitive element. It is an additional object of this invention to provide a mechanism which continuously measures and records the temperature along a predetermined path in a reaction zone using a single temperature sensitive element. It is a further object of this invention to provide such a mechanism which indicates the relative position of the temperature sensitive element along the predetermined path and to indicate and record the point at which the direction of travel of such element is reversed. It is another object of this invention to provide a mechanism for taking the temperature profile along a predetermined path in a reaction zone which may be readily and accurately controlled by an operator. Other objects of the invention will become apparent in the course of the detailed description thereof.

The mechanism of this invention comprises a temperature sensing means positioned within a reaction zone, moving means adapted for reciprocably moving the sensing means along a predetermined path in such reaction zone, temperature indicating means responsive to the temperature sensing means, and position indicating means for showing the position of the temperature sensing means along such path.

In a more specific embodiment, the mechanism of the invention comprises a temperature sensing means positioned within the reaction zone, moving means adapted for moving the temperature sensing means along a predetermined path in the reaction zone and adapted for automatically reversing the direction of travel of the sensing means, temperature indicating means responsive to the temperature sensing means, and position indicating means adapted for showing the position of the temperature sensing means along such path.

In a still more specific embodiment, the mechanism of this invention comprises an electrical temperature sensing means positioned within a reaction zone, moving means adapted for moving the temperature sensing means along a predetermined path within such zone and adapted for automatically reversing the direction of travel of the sensing means, temperature indicating means responsive to the sensing means adapted for recording the temperature and the point of reversal of direction of travel of the temperature sensing means, and position indicating means responsive to the moving means adapted for showing the position of the temperature sensing means along such path.

Particular embodiments of the mechanism of the invention are set out in the annexed figures which form a part of this specification.

The invention is hereinafter described in detail in connection with the embodiments shown in the foregoing figures.

Figure 1:
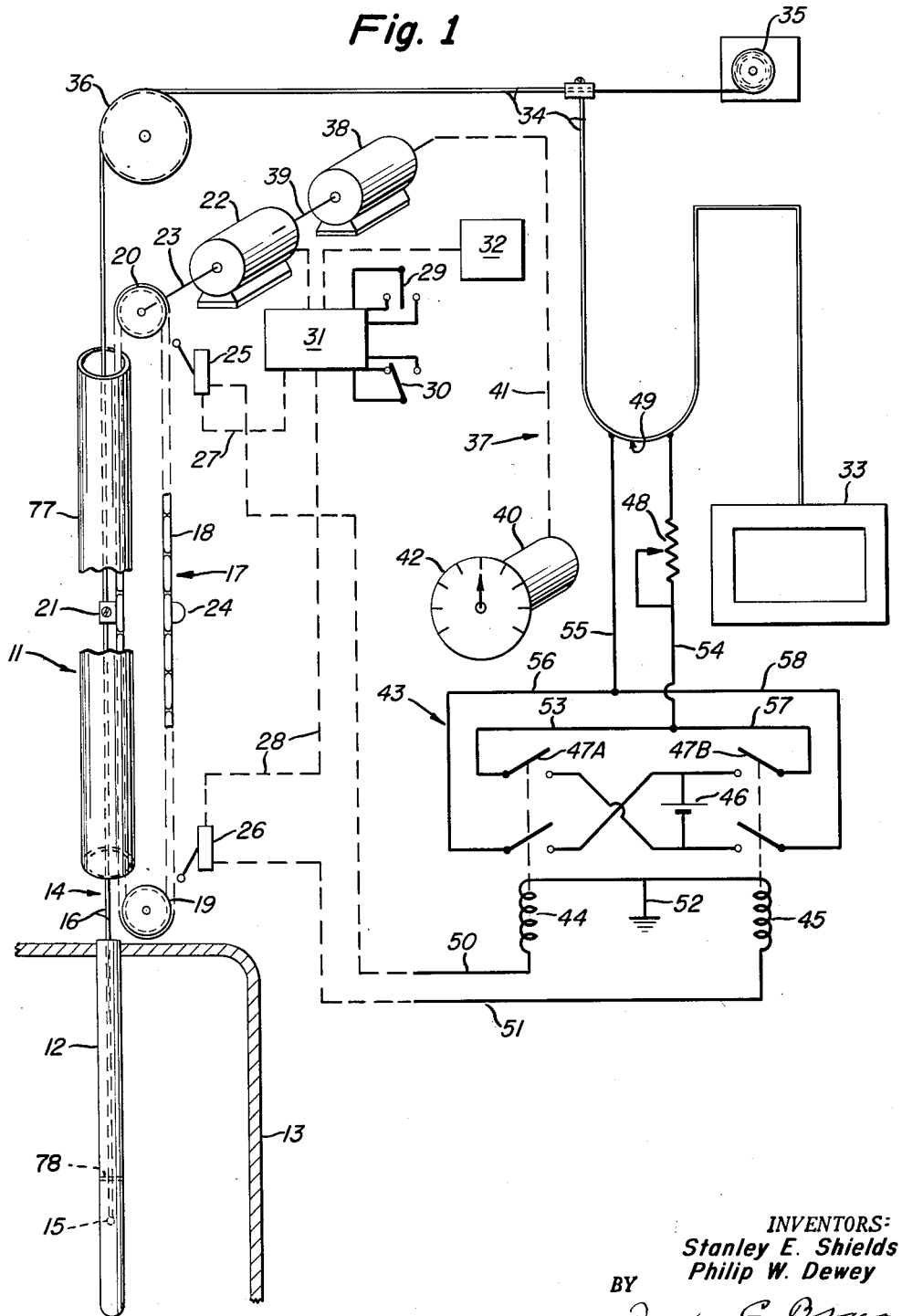
FIGURE 1 is a schematic diagram of an automatically controlled mechanism of the invention.

Referring now to FIGURE 1, temperature sensing means 11 is shown extending into a thermowell 12 which is positioned within a reactor 13, only a section of which is shown. Herein temperature sensing means 11 comprises a thermocouple 14 having a bimetallic junction 15 and output leads 16. Alternative to thermocouple 14, the temperature sensing means may be other means based on the measurement of electrical properties for determining temperature, such as a resistance thermometer, or it may be means based on a measurement of some other property, such as change in pressure or volume as is utilized in a fluid-filled bulb thermometer.

Moving means 17 is adapted for reciprocably moving temperature sensing means 11 along a predetermined path, and in the embodiment of FIGURE 1, comprises a chain 18, preferably a link or ladder chain, mounted on idler sprocket 19 and driving sprocket 20 and capable of being driven by driving sprocket 20. Terminal head 21 is affixed in an electrically insulated fashion to chain 18 at a point between sprocket 19 and sprocket 20. Output leads 16 of thermocouple 14 are electrically connected to terminal head 21. A reversible motor 22 drives sprocket 20 through mechanical linkage 23.

The embodiment shown in FIGURE 1 provides a lug 24 positioned on chain 18 between driving sprocket 20 and idler sprocket 19 and a first switch 25 and a second switch 26, each of such switches being electrically connected through circuits 27 and 28 to reversible motor 22. Both switches 25 and 26 are positioned adjacent to chain 28 and adapted for actuation by lug 24, switch 25 being positioned between lug 24 and sprocket 20 and switch 26 being positioned between lug 24 and sprocket 19.

Reversible motor 22 is provided with a three-position switch 29 which is used on manual operation, and a two-position switch 30 for selecting between manual and automatic operation. A receptacle 31, used to house the simple electrical circuitry for controlling reversible motor 22, and a (optional) time-cycle controller 32, are shown schematically.

Temperature indicating means 33 responsive to temperature sensing means 11 is adapted for converting the property of temperature sensing means 11 used to measure the temperature into an indication of the magnitude of such temperature. Temperature indicating means 33 may be, for instance, a potentiometric temperature recorder with provision for continuously indicating the temperature on a chart. Lead wires 34 connect temperature sensing means 11 with temperature indicating means 33 at terminal head 21. Spring 35 is connected to lead wires 34. Pulley 36 may optionally be provided as a guide for lead wires 34.

Figure 2:
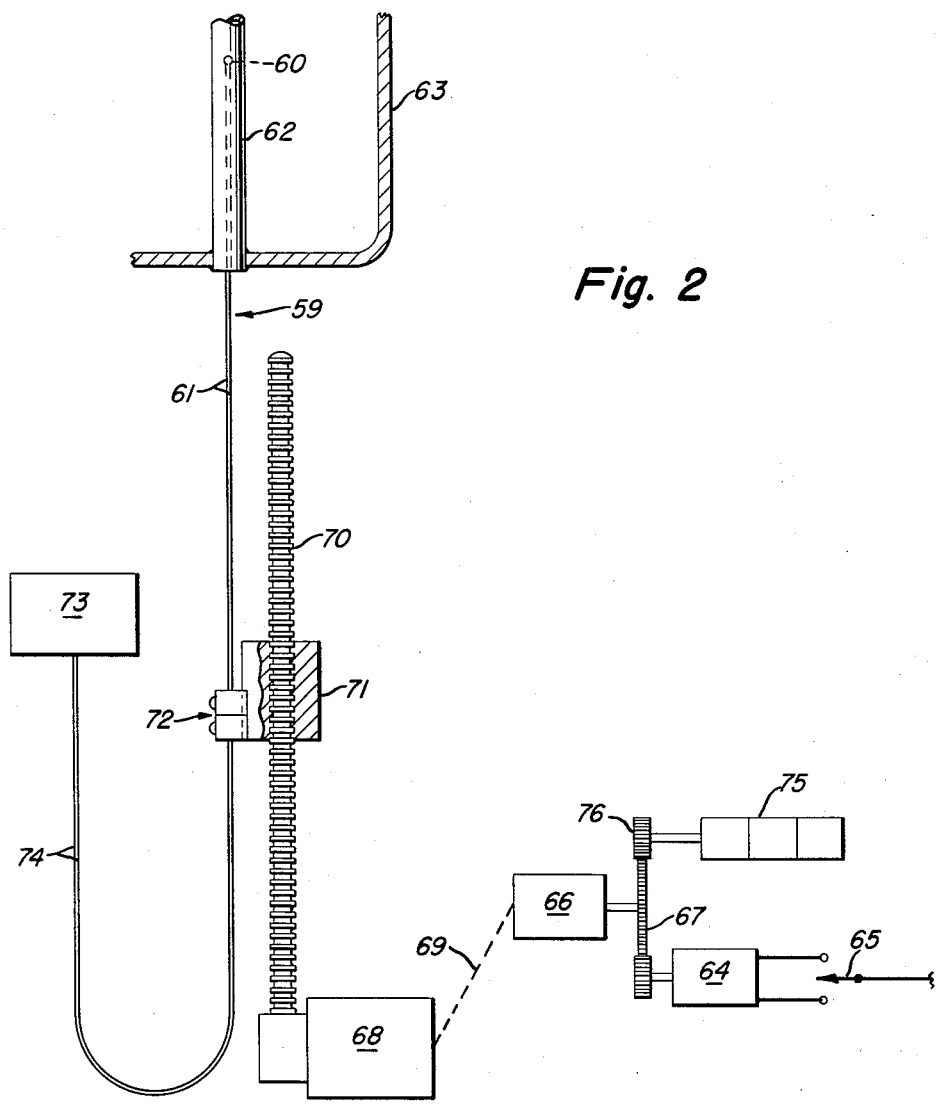
FIGURE 2 is a schematic diagram of a manually controlled mechanism of the invention.

Position indicating means 37 comprises herein a generator 38 driven through linkage 39 by reversible motor 22, a slave motor 40 driven by generator 38 and adapted for rotational movement proportional to the rotational movement of generator 38 and electrically connected therewith through lines 41, and a calibrated dial 42 driven by slave motor 40. A digital counter (as shown in FIGURE 2, element 75) actuated by slave motor 40 may be used alternatively to the calibrated dial 42.

Outer guide means 77 and/or inner guide means 78 may be optionally provided in order to prevent lateral deflection of thermocouple 14.

Still referring to the embodiment shown in FIGURE 1, the mechanism of the invention may be provided with means 43 for indicating reversal of travel of bimetallic junction 15 along the predetermined path by showing an abrupt change on the above-mentioned chart of temperature indicating means 33, such change indicating a particular change in direction of travel of bimetallic junction 15. As shown, means 43 comprises a first solenoid 44, a second solenoid 45, a source of electromotive force 46, a reversing relay 47A and 47B, a resistance 48 and circuitry electrically connecting the foregoing with a section 49 of one of lead wires 34. The first solenoid 44 is electrically connected through line 50 to first switch 25, and second solenoid 45 is connected through line 51 to switch 26. Solenoids 44 and 45 are connected to ground 52.

The circuitry connecting electromotive force 46, reversing relay 47A and 47B, resistance 48 and a section 49 of one of lead wires 34 is as follows: when relay switch 47A is closed, in a mode of operation described hereinafter, the circuitry comprises lines 53 and 54, section 49, lines 55 and 56, and electromotive force 46; when relay switch 47B is closed, the circuitry comprises lines 57 and 54, section 49, lines 55 and 58, and electromotive force 46. Both halves of reversing relay 47A and 47B are normally open.

FIGURE 2 shows an embodiment of the invention adapted for manual control of the travel of the temperature sensing means. As shown, the temperature sensing means comprises a thermocouple 59 being provided with a bimetallic junction 60 and output leads 61. Thermocouple 59 is shown being thrust upwardly into a thermowell 62 of a reaction vessel 63, only a portion of which is shown.

The moving means comprises a reversible motor 64 being provided with a three-position switch 65 enabling an operator to stop motor 64 or to make it rotate in either direction around its axis. Motor 64 drives a generator 66 through a mechanical linkage 67. Generator 66 in turn drives a slave motor 68 by means of electrical connection 69. Slave motor 68 is adapted for rotational movement proportional to the rotational movement of generator 66. Slave motor 68 is mechanically linked to worm gear 70. Gear follower 71 is positioned on worm gear 70 and adapted to be driven along the axis of worm gear 70. Gear follower 71 is preferably provided with ball bearings in order to reduce friction as it travels along worm gear 70. Terminal head 72 is affixed to follower 71 and electrically insulated therefrom. Output leads 61 are electrically connected to terminal head 72. Temperature indicating means 73 is connected to terminal head 72 through lead wires 74 and is adapted for receiving the output of thermocouple 59 and indicating the corresponding temperature.

As shown, position indicating means comprises a digital counter 75 connected to generator 66 through mechanical linkage 76.

In addition to the embodiment shown in FIGURES 1 and 2, the moving means of the invention may comprise other mechanical forms, such as a rack and pinion gear arrangement.

The mode of operation of the mechanism of the invention will now be described with reference to the embodiment shown in FIGURE 1. In an automatic operation, motor 22 turns sprocket 20 which moves chain 18, which in turn moves thermocouple 14 along its path in thermowell 12. The rate at which thermocouple 14 reverses its path is controlled by the speed of rotation of motor 22 and the design of sprocket 20 and linkage 23. Generally the speed of traverse is designed to be in the range of about one inch to about ten inches per minute. The electromotive force generated by thermocouple 14 is conducted through output leads 16 and lead wires 34 to temperature indicating means 33 which may, for instance, indicate the corresponding temperature by tracing a line on a calibrated chart.

The position of the temperature sensing element, which in FIGURES 1 and 2 is the bimetallic junction of the thermocouple, is indicated on a calibrated dial 42 or, as is shown in FIGURE 2, on a digital counter 75. The position of the temperature sensing means along its predetermined path in a reaction zone is determined by motor 22 driving generator 38 through a mechanical linkage 39. Generator 38 in turn drives slave motor 40 through electrical connection 41. It will be obvious that dial 42 could be directly connected to motor 22 through an appropriate mechanical linkage, thereby eliminating generator 38 and slave motor 40. However, this would require that dial 42 be located in the proximity of motor 22 which in turn is located in the proximity of reaction zone 13. Use of generator 38 and slave motor 40 enables the position indicating dial 42 to be located at a point distant from reaction zone 13, e.g., in a control house.

As thermocouple 14 is thrust deeper into thermowell 12, lug 24 approaches first switch 25. When lug 24 comes in contact with switch 25, it actuates switch 25, which in turn actuates a reversing relay in receptacle 31, thereby reversing the direction of rotation of motor 22, thereby reversing the direction of travel of thermocouple 14. In similar fashion, when lug 24 comes in contact with switch 26, the direction of rotation of motor 22 is again reversed. The length of the path along which bimetallic junction 15 travels may be adjusted by the relative positioning of switches 25 and 26 in relation to lug 24, subject to the over-all limitation imposed by the distance between sprockets 19 and 20.

The embodiment shown in FIGURE 1 is provided with a three-position switch 29 which enables an operator to manually control the direction of travel of thermocouple 14 and to manually arrest the movement of thermocouple 14. The mechanism of the invention may also be provided with a time-cycle controller 32 which may provide for movement of thermocouple 14 at preset intermittent intervals.

It is sometimes desirable to have an indication on the above-described temperature recording chart of when the thermocouple 14 reverses its direction of travel. This may be provided by using above-described means 43. As shown in FIGURE 1, first switch 25 is electrically connected to first solenoid 44. During the time when lug 24 is in contact with switch 25, solenoid 44 is energized, thereby closing that portion of reversing relay marked 47A. This causes an additional voltage from electromotive force 46 to be added to a section of one of lead wires 34, which in turn causes an abrupt change in the line being drawn on the chart of temperature indicating means 33. Since lug 24 will be in contact with switch 25 for a relatively short time in comparison with the time required for thermocouple 14 to make one full traverse of its path, the above-mentioned abrupt change will appear as a pip on such chart. When lug 24 is no longer in contact with switch 25, solenoid 44 is deenergized and reversing relay 47A is again opened.

In similar fashion, during the time when lug 24 is in contact with second switch 26, second solenoid 45 is energized, thereby closing that portion of the reversing relay marked 47B. In this instance the voltage from electromotive force 46 will be subtracted from the voltage generated by thermocouple 14, thereby causing an abrupt change in the line drawn on the above-mentioned chart but in a direction opposite to the abrupt change made when lug 24 is in contact with first switch 25. The difference in direction of the abrupt change on the chart indicates whether the thermocouple is reversing direction at the top or bottom of its path.

The magnitude of the voltage added to or subtracted from section 49 of a lead wire 34 should be relatively small, on the order of one to ten percent, preferably one to five percent of the voltage generated by thermocouple 14 at the temperatures being measured. Resistance 48 may be adjusted to control the amperage and, consequently, the voltage so added or subtracted, thereby adjusting the extent of the above-described abrupt change.

A spring 35 may be connected in an electrically insulated fashion to lead wires 34 to maintain a constant tension of the lead wires at their point of connection with terminal head 21 and to otherwise aid in preventing the lead wires from obstructing work around the unit.

Having described the invention, what is claimed is:

1. A mechanism for continuously measuring the temperature along a predetermined path in a reaction zone, which mechanism comprises an electrical temperature sensing means positioned within said reaction zone, moving means adapted for moving said temperature sensing means along said predetermined path and adapted for automatically reversing at predetermined points the direction of travel of said temperature sensing means, temperature indicating means responsive to both said temperature sensing means and to said moving means and adapted for continuously recording temperature and for recording the point of reversal of direction of travel of said sensing means, and position indicating means responsive to said moving means and adapted for showing the position of said temperature sensing means along said path.

2. The mechanism of claim 1 wherein said moving means comprises a worm gear.

3. The mechanism of claim 1 wherein said moving means comprises a link chain mounted on sprockets.

4. The mechanism of claim 1 wherein said position indicating means comprises a generator responsive to said moving means, a slave motor responsive to said generator, and a digital counter.

5. A mechanism for continuously measuring the temperature along a predetermined path in a reaction zone, which mechanism comprises an electrical temperature sensing means positioned within said reaction zone, moving means adapted for continuously moving said sensing means along said predetermined path and adapted for automatically reversing the direction of travel of said sensing means at the terminal points along said path, which moving means comprises a driving sprocket and an idler sprocket, a link chain mounted on said sprockets capable of being driven by said driving sprocket, means adapted for affixing said sensing means to said chain at a point between said sprockets, a reversible motor mechanically linked to said driving sprocket, a lug positioned on said chain between said sprockets, a first switch and a second switch, each of said switches being electrically connected to said motor, positioned adjacent to said chain and adapted for actuation by said lug, whereby actuation of either of said switches by said lug reverses the direction of rotation of said motor, said first switch being positioned between said lug and said driving sprocket, said second switch being positioned between said lug and said idler sprocket, temperature indicating means responsive to said sensing means adapted for continuously indicating on a chart temperature and the point of reversal of travel of said sensing means along said path, and position indicating means responsive to said motor adapted for showing the position along said path of said sensing means, which position indicating means comprises a digital counter.

6. A mechanism for continuously measuring and indicating the temperatur ealong a predetermined path in a reaction zone, which mechanism comprises a thermocouple comprising a bimetallic junction and output leads, said bimetallic junction being positioned within said reaction zone and freely movable along said predetermined path, a driving sprocket, an idler sprocket, a link chain mounted on said sprockets and capable of being driven by said driving sprocket, a terminal head affixed to and electrically insulated from said chain at a point between said sprockets, said output leads being electrically connected to said terminal head, a reversible motor mechanically linked to said driving sprocket, a lug positioned on said chain between said sprockets, a first switch and a second switch, each of said switches being electrically connected to sai dmotor and each positioned adjacent to said chain and adapted for actuation by said lug, whereby actuation of either of said switches by said lug reverses the direction of rotation of said motor, said first switch being positioned between said lug and said driving sprocket and said second switch being positioned between said lug and said idler sprocket, a generator driven by said reversible motor, a slave motor driven by said generator and adapted for rotational movement proportional to the rotational movement of said generator, position indicating means actuated by said slave motor indicating the position of said bimetallic junction along said path, potentiometric temperature indicating means, and lead wires connecting said terminal head to said temperature indicating means.

7. The mechanism of claim 6 wherein said temperature indicating means comprises a potentiometric temperature recorder providing for continuously indicating temperature on a chart and means for indicating the reversal of travel of said bimetallic junction along said path by showing an abrupt change on said chart of a character indicating the particular change in direction of travel of said bimetallic junction, which travel reversal indicating means comprises a first solenoid connected to said first switch, said first solenoid being energized while said lug is in contact with said first switch, a second solenoid connected to said second switch, said second solenoid being energized while said lug is in contact with said second switch, a source of electromotive force, circuitry comprising said force, a resistance, a reversing relay and a section of one of said lead wires, said circuitry being adapted for providing a voltage drop across said section of from about one to about ten percent of the voltage produced by said thermocouple, said reversing relay being adapted for reversing in said circuitry the flow of current produced by said force, said reversal of current being accomplished by closing said reversing relay by the energizing of one of said solenoids, thereby causing said abrupt change on said chart of a character determined by the particular solenoid then energized.

References Cited in the file of this patent

UNITED STATES PATENTS

| | | |
|---|---|---|
| 1,870,362 | Hart | Aug. 9, 1932 |
| 2,025,015 | Byrns | Dec. 17, 1935 |
| 2,397,339 | Crosby | Mar. 26, 1946 |
| 2,646,681 | Walton | July 28, 1953 |
| 2,683,371 | Droin | July 13, 1954 |
| 2,685,798 | Goble | Aug. 10, 1954 |
| 2,808,581 | Findlay | Oct. 1, 1957 |

FOREIGN PATENTS

| | | |
|---|---|---|
| 910,426 | France | Jan. 28, 1946 |